Figure 1:
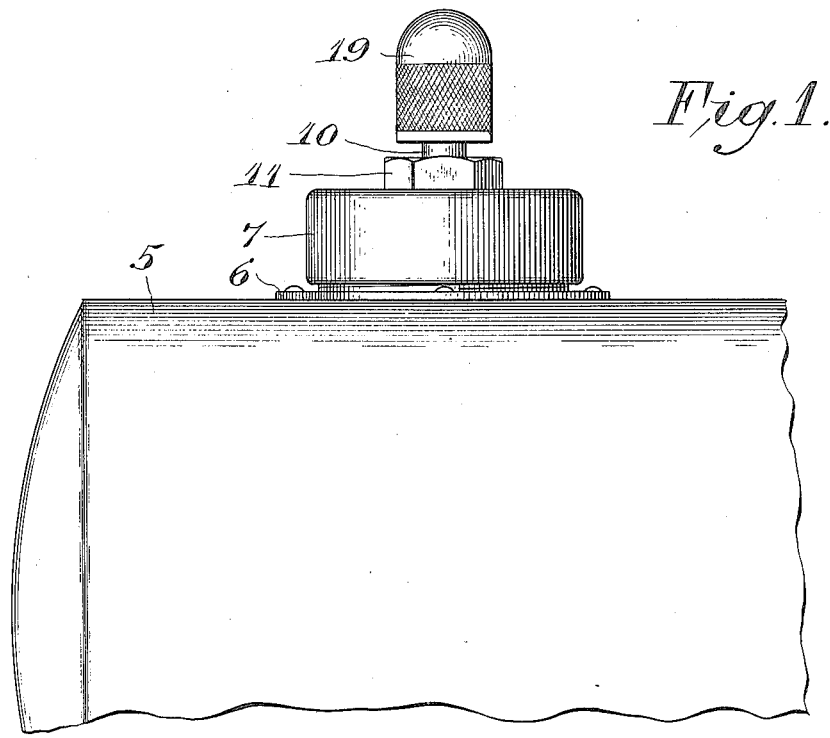
Figure 2:
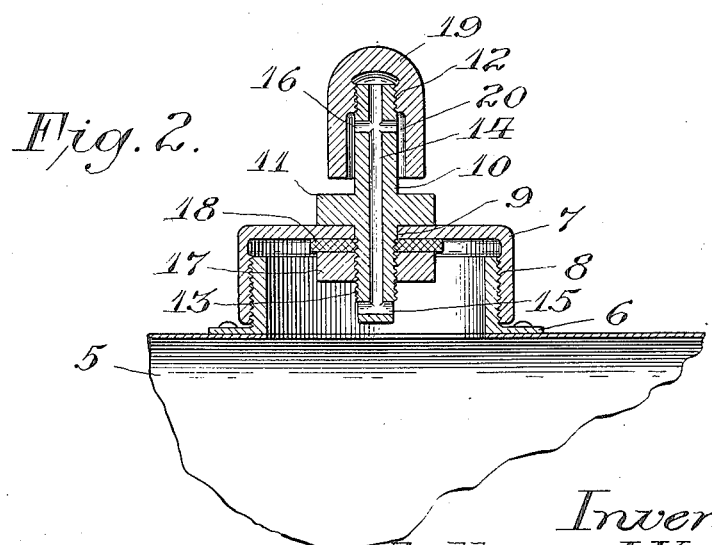

July 1, 1924.  A. J. KRUPPA  1,499,461

AIR VENT

Filed June 21, 1922

Inventor.
Anthony J. Kruppa,
By John P. Smith
Atty.

Patented July 1, 1924.
1,499,461
UNITED STATES PATENT OFFICE.
ANTHONY J. KRUPPA, OF CHICAGO, ILLINOIS.
AIR VENT.

ber having a channel communicating with the aperture in the upper end of said member.

2. An air vent in combination with a cap of a gasoline tank, comprising a member having a vertically disposed aperture, said member being provided at its opposite end with horizontally disposed apertures communicating with said vertically disposed aperture and a supplemental cap secured to said member forming a channel communicating with one of said horizontally disposed apertures.

In testimony whereof I affix my signature.

ANTHONY J. KRUPPA.